United States Patent
Malas et al.

(10) Patent No.: US 11,496,912 B2
(45) Date of Patent: *Nov. 8, 2022

(54) SIGNALING ASSESSMENT OF WIRELESS RECEIVERS

(71) Applicant: CABLE TELEVISION LABORATORIES, INC., Louisville, CO (US)

(72) Inventors: Daryl Malas, Broomfield, CO (US); Joshua Redmore, Longmont, CO (US); Orne Brocaar, Amsterdam (NL)

(73) Assignee: Cable Television Laboratories, Inc., Louisville, CO (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/013,575

(22) Filed: Sep. 5, 2020

(65) Prior Publication Data
US 2020/0404515 A1 Dec. 24, 2020

Related U.S. Application Data

(63) Continuation of application No. 16/116,471, filed on Aug. 29, 2018, now Pat. No. 10,771,988.

(60) Provisional application No. 62/700,376, filed on Jul. 19, 2018, provisional application No. 62/551,406, filed on Aug. 29, 2017.

(51) Int. Cl.
| | |
|---|---|
| *H04W 24/02* | (2009.01) |
| *H04L 43/10* | (2022.01) |
| *H04W 36/00* | (2009.01) |
| *H04L 43/062* | (2022.01) |
| *H04W 24/10* | (2009.01) |

(52) U.S. Cl.
CPC ............ *H04W 24/02* (2013.01); *H04L 43/10* (2013.01); *H04L 43/062* (2013.01); *H04W 24/10* (2013.01); *H04W 36/0058* (2018.08)

(58) Field of Classification Search
CPC . H04W 24/02; H04W 24/10; H04W 36/0058; H04L 43/10; H04L 43/062
See application file for complete search history.

(56) References Cited

U.S. PATENT DOCUMENTS

| | | | | |
|---|---|---|---|---|
| 8,060,102 B2* | 11/2011 | Gazzola | ................ | H04W 16/18 455/454 |
| 9,400,192 B1* | 7/2016 | Salser, Jr | ................ | G01F 15/18 |
| 2007/0076671 A1* | 4/2007 | Winget | ............... | H04L 63/0892 370/338 |
| 2008/0171556 A1* | 7/2008 | Carter | .................. | H04W 24/08 707/999.201 |
| 2011/0246850 A1* | 10/2011 | Rault | ................ | H03M 13/6525 714/752 |
| 2012/0038521 A1* | 2/2012 | Zhu | ...................... | H04B 17/318 343/703 |

(Continued)

FOREIGN PATENT DOCUMENTS

WO WO-2012079242 A1 * 6/2012 ........ H04W 36/0033

*Primary Examiner* — Mohammad S Anwar
(74) *Attorney, Agent, or Firm* — PdZ Patent Law, PLLC

(57) ABSTRACT

Assessing signaling characteristics for wireless receivers after being deployed within a service area is contemplated. The wireless receivers may be assessed for purposes of optimizing signaling interactions according to measurements generated during normal operating conditions and/or as a function of actual usage as opposed to estimates or other approximations generated prior to deployment.

20 Claims, 4 Drawing Sheets

(56) References Cited

U.S. PATENT DOCUMENTS

| | | |
|---|---|---|
| 2013/0188628 A1 | 7/2013 | Lee |
| 2013/0316728 A1 | 11/2013 | Bradley |
| 2014/0059218 A1 | 2/2014 | Ganu |
| 2014/0128074 A1* | 5/2014 | Vangala ................ H04W 36/22 |
| | | 455/436 |
| 2016/0007278 A1 | 1/2016 | Gupta |
| 2016/0198326 A1 | 7/2016 | Shmidt |
| 2017/0094556 A1* | 3/2017 | HomChaudhuri .... H04W 28/06 |

* cited by examiner

SIGNALING ASSESSMENT OF WIRELESS RECEIVERS

CROSS-REFERENCE TO RELATED APPLICATIONS

This application is a continuation of U.S. application Ser. No. 16/116,471, filed Aug. 29, 2018, which application claims the benefit of U.S. provisional application No. 62/551,406 filed Aug. 29, 2017, and U.S. provisional application No. 62/700,376 filed Jul. 19, 2018, the disclosures of which are hereby incorporated in their entireties by reference herein.

TECHNICAL FIELD

The present invention relates to assessing signaling characteristics for wireless receivers after being deployed within a service area, such as but not necessarily limited to facilitating the assessment for purposes of optimizing wireless, signaling interactions between the wireless receivers.

BACKGROUND

More and more wireless receivers are being deployed to facilitate any number of wireless interactions between themselves and one or more associated clients/devices.

The wireless signaling may correspond with the Institute of Electrical and Electronics Engineers (IEEE) 802.11 series of standards for Wi-Fi, such as according to Part 11: Wireless LAN Medium Access Control (MAC) and Physical Layer (PHY) Specifications, Amendment 1: Radio Resource Measurement of Wireless LANs (IEEE 802.11k) and/or Amendment 9: Interworking with External Networks (Hotspot 2.0, IEEE 802.11u). The wireless signaling may correspond with that described in the CableLabs technical report for Wireless Wi-Fi entitled Wi-Fi Radio Resource Management (RRM)/Self Organizing Networks (SON) Technical Report (WR-TR-RRM-SON-V01-140926) and the CableLabs specification entitled Wi-Fi Provisioning Framework Specification (WR-SP-WiFi-MGMT-I04-140311). The disclosures of which are hereby incorporated by reference in their entireties herein.

The wireless signaling may correspond with cellular standards, such as Long-Term Evolution (LTE) based on the Global System for Mobile Communications (GSM)/Enhanced Data rates for GSM Evolution (EDGE) and Universal Mobile Telecommunications System (UMTS)/High Speed Packet Access (HSPA) network technologies developed by the 3rd Generation Partnership Project (3GPP) as specified in its Release 8 and 9 document series and/or TS 36.201, 36.300, 36.304, 36.306, 36.321, 36.322, 36.323, 36.331, 36.401, 36.306 and 36.902 (self-organizing Network (SON)). The disclosures of which are hereby incorporated by reference in their entireties herein.

The wireless signaling may correspond with as Internet of Things (IoT) devices and capable of Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), Zigbee, ZWave etc. The disclosures of which are hereby incorporated by reference in their entireties herein.

A new area of IoT involves the use of sensors designed for wirelessly transmitting information periodically over long distances for years on a single battery. The infrastructure to support these connected devices is commonly referred to as a low power wide area network (LPWAN), which may operate in accordance with the processes and infrastructure described in U.S. application Ser. No. 15/844,087, entitled Normalization of Data Originating from Endpoints within LPWANs and/or LoraWAN Specification, version 1.1, published Oct. 11, 2017, the disclosures of which are hereby incorporated by reference in their entireties herein. LPWANs may be designed to cover large geographical areas in a manner intended to minimize the amount of power required for sensors to interact with the network. The nature of a LPWAN network may allow IoT devices to run for years on small batteries, occasionally sending out small packets of data, waiting for a short time for response messages, and then closing the connection until more data needs to be sent.

The wireless receivers deployed within a particular service area may include capabilities for facilitating signaling associated with one or more of the foregoing wireless protocols/standards and/or according to other wireless requirements such that the wireless signaling within the service area may be influenced by an interrelation of signaling characteristics. One non-limiting aspect of the present invention contemplates assessing the signaling characteristics after the wireless devices are deployed within the service area due to an inability to sufficiently assess or estimate the signaling influences prior to deployment of the wireless receivers, such as to facilitate generating a map or other assessment of the signaling influences within the service area using real-world or actual usage data collected following deployment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
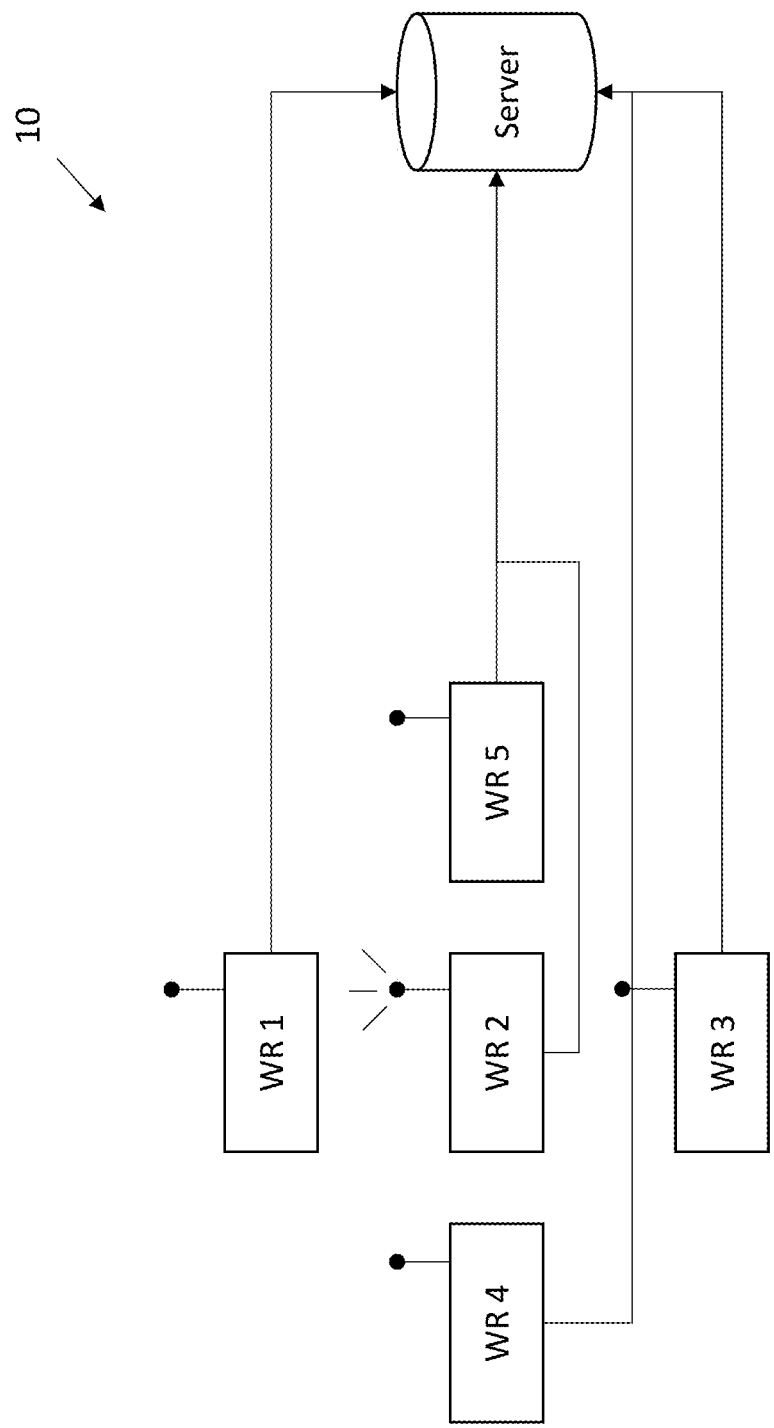
FIG. 1 illustrates a system for assessing wireless signaling characteristics within a service area in accordance with one non-limiting aspect of the present invention.

FIG. 1 illustrates a system 10 for assessing wireless signaling characteristics within a service area in accordance with one non-limiting aspect of the present invention. The system 10 is shown for exemplary purposes as including a server in communication with a plurality of wireless receivers (WRs). The server may be any entity connected wirelessly and/or wiredly to the wireless receivers to facilitate controlling the operations thereof, an independent entity connected to the Internet or other network in communication with the wireless receivers and/or any other logically executing device having capabilities sufficient to facilitate the operations contemplated herein, such as but not necessarily limited to a LoRa server, a MME (3GPP) and/or Wireless LAN Controller (WLC). The wireless receivers may be any device having capabilities to facilitate wireless signaling with client/devices connected, associated or otherwise authenticated for use therewith (not shown). The wireless receivers may be gateways, access points, user equipment, enodeBs, terminals and the like having capabilities sufficient to facilitate signaling associated with Wi-Fi, cellular, 3GPP, LTE, chirp spread spectrum (CSS) modulation and/or the wireless signaling types noted above.

One non-limiting aspect of the present invention contemplates the system facilitating detection of wireless receivers within range of a particular service area, such as a service area centered at or associated with a single or selected one of the wireless receivers. The system permits for mapping a network and understanding a strength or other characteristics of signaling in the related service area, including the influences of signaling from multiple wireless receivers overlapping with each other. The signal aggregation described and contemplated herein may be useful in optimizing operation of the wireless receivers to facilitate desired network performance. Optimizations can include shutting off unnecessary wireless receivers, reducing power output of wireless receivers, understanding redundancy to confirm gateway resiliency, informing operators for network coverage planning and deployments, generating Key Performance Indicators (KPIs) and establishing Service Level Agreements (SLAs). The server may instruct one of the wireless receivers to wirelessly broadcast an artificial message or ping whereby measurements performed at the other wireless receivers on the ping detecting thereat may be used to generate radio data.

The wireless receivers reached with the ping may assess and report the related signaling characteristics to the server as the radio data, such as with transmission of reporting messages thereto. The signaling characteristics may be sufficient to represent the signaling influences of the wireless receiver originating the ping on the wireless receivers within a wireless range thereof. Variations in the characteristics of the ping as received at the different wireless receivers can be related to develop a mapping or modeling of signaling influences within the service area. The process can be iteratively repeated with each of the wireless receivers correspondingly issuing pings for purposes of generating radio data sufficient for assessing the influences of those wireless receivers relative to the other wireless receivers within a wireless range thereof. The server may correlate the resulting radio data with provisioned GPS/Location data of each wireless receiver to facilitate evaluating the wireless receivers originating each ping, the radio information (e.g., latency, RSSI) from the received ping data and the wireless receivers that received and forwarded the ping to the server.

The ping may be simply a message optionally communicated with an associated identifier to indicate the originating gateway, such as in a manner similar to the sensor data communicated in an LPWAN. The server may periodically send a ping through each of the wireless receivers within the service area desired for assessment to facilitate generation of the radio data. FIG. 1 illustrates an exemplary scenario where the server may request wireless receiver 2 (WR 2) to emit a ping. The ping or ping message may be constructed by the server or WR 2 as a frame (e.g. of type "Proprietary") containing an associated identifier to indicate the originating wireless receiver. The server may then send this PHYPayload to the WR 2 to initiate its transmission, optionally with corresponding instructions to the other wireless receivers to measure the receipt thereof, which, such as in the case of an LPWAN configuration, may correspond with the wireless receivers being stateless whereby they may automatically forward the resulting traffic to the server. The wireless receivers within range of WR 2 may forward the ping or a related message to the server to apprise the server of the attendant radio data and signaling characteristics measured thereat. The ping may also be any other construct, such as a hello message, a test signal or the like, sufficient to facilitate the measurements contemplated herein, which may vary according to the wireless protocols and/or operational capabilities of the wireless receivers The generated radio data may include virtually any signaling characteristic measurable at the wireless receivers in response to receipt of the ping, which may vary depending on the measurement capabilities of the wireless receiver, i.e., some wireless receivers may be able to perform measurements that others are unable to perform and/or some wireless receivers may operate according to differing protocols or reporting capabilities that may limit the information available for forwarding to the server. One non-limiting aspect of the present invention contemplates the radio data including signaling characteristics sufficient for determining a frequency, a received signal strength indicator (RSSI), a received signal code power (RSCP), a reference signal received quality (RSRQ), a reference signal received power (RSRP) a signal-to-noise ratio (SNR) and/or a spread factor (SF) of the ping as received at each of the wireless receivers. The server can correlate this information and compare it, such as by generating a table sufficient for cross-referencing the radio data for each wireless receiver detecting a particular ping, e.g., when WR 2 transmits a ping, the table may include: WR 1—Freq: 903.5, SF: 10, RSSI: −115, SNR: −3.2, BW: 125; WR 3—Freq: 903.5, SF: 10, RSSI: −119, SNR: −6.8, BW: 125; WR 4—Freq: 903.5, SF: 10, RSSI: −83, SNR: 0.2, BW: 125; and WR 5—Freq: 903.5, SF: 10, RSSI: −100, SNR: −1.4, BW: 125. The output can be aggregated into a map or list format, such as to indicate WR 2 have neighbors listed by RSSI: WR 4; WR 5; WR 1; and WR 3

By analyzing the radio data over multiple transmissions, the server can determine the wireless receivers providing redundancy and/or signaling overlap to a specific gateway. It can map a known network (networks identified through roaming, federated partner networks or owned entirely by the operator). Based on this information, the operator can derive network information, such as wireless receiver availability, redundant wireless receivers for a specific geographic area, service availability and unnecessary wireless receivers, which can be disabled for traffic reduction. The system enables the server to understand through iterative analysis how the operation of the wireless receivers following deployment influence wireless signaling with a service area. The capability for assessing signaling characteristics after the wireless devices have been deployed may be beneficial in facilitating subsequent optimizations and more beneficial than optimizing operations according to estimates of the signaling characteristics made prior to deployment due to such estimates necessarily being insufficient to accurately depict how real-world, actual environmental influences and signaling interdependencies affect coverage within a service area.

Figure 2:
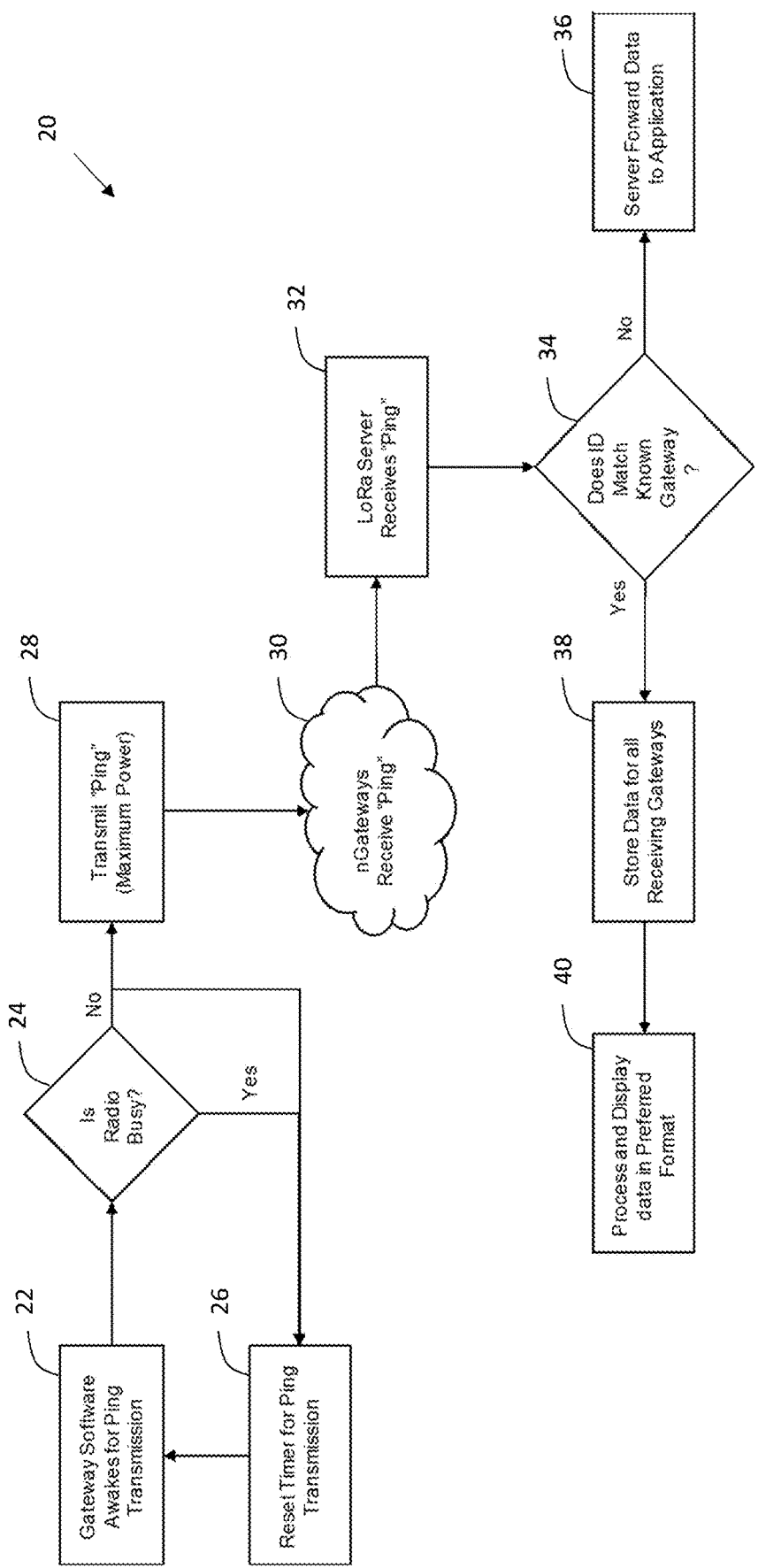
FIG. 2 illustrates a flowchart of a method for assessing wireless receivers in accordance with one non-limiting aspect of the present invention.

FIG. 2 illustrates a flowchart 20 of a method for assessing wireless receivers in accordance with one non-limiting aspect of the present invention. The method may be embodied in a computer-readable medium having a plurality of non-transitory instructions executable with a suitable processor of the wireless receivers and/or the server to facilitate the operations contemplated herein. The flowchart illustrates an exemplary, LPWAN implementation whereby the wireless receivers are gateways deployed as part of an LPWAN infrastructure to facilitate reporting data to a LoRa server. Block 22 relates to software or other executing construct on one of the gateways being awoken to facilitate transmission of a ping or other message to its surrounding environment. The gateway originating the ping may receive a frame or other information from the LoRa server to facilitate generating a corresponding signal, which may optionally specify transmission characteristics for the ping, a timestamp, a reference number or other information to facilitate tracking its propagation as well as to facilitate aggregation within a map, a table or other signaling references kept by the LoRa server to facilitate compiling radio data.

Block 24 relates to the originating gateway determining whether its radio is available for wirelessly transmitting the ping to the surrounding area. Block 26 relates to setting or re-setting a timer to trigger transmission of the ping in the event the radio is busy, which may occur if the corresponding gateways are utilized to facilitate other signaling activities. Block 28 relates to the originating gateway transmitting the ping after determining the radio to be available. The ping may be transmitted at a maximum power level or a predefined power level according to instruction parameters included within the ping information sent from the LoRa server. The ping need not necessarily be transmitted at a maximum power level in the event it is undesirable to assess a maximum signaling range from the originating gateway, such as if typical operations of the originating gateway utilize signaling at lower power levels. Block 30 relates to the non-originating gateways within a signaling range of the originating gateway receiving the ping and performing corresponding measurements thereat, which may be individually tabulated at the non-originating gateways to create radio data. Block 32 relates to the LoRa server receiving the corresponding radio data within report messages transmitted from the non-originating gateways detecting receipt of the ping, i.e., one or more gateways within the service area that failed to receive the ping may avoid sending report messages and/or may provide report messages indicating a failure to receive the ping.

Block 34 relates to the LoRa server assessing whether an ID included within the report messages for identifying the gateway originating the ping is known. An ID may be considered to be known if it was previously associated with a gateway within the control or domain of the LoRa server or otherwise identified as being appropriate for consideration or inclusion within the radio data aggregation being performed by the LoRa server. Block 36 relates to determining the ID to be unknown and the LoRa server correspondingly forwarding the report messages to an application or other entity for further processing, which may occur in the event the LoRa server operates statelessly for purposes of forwarding information outside of the radio data needed for facilitating the signaling assessments contemplated herein. Block 38 relates to the LoRa server storing the received radio data for each of the non-originating gateways receiving the ping. The stored data may be cross-referenced in a table, database or other relationship sufficient to facilitate associating the attendant signaling characteristics with the originating gateway and the non-originating gateways. The stored information may be iteratively appended with radio data generated from each of the gateways in turn acting as an originating gateway for purposes of transmitting a ping.

Block 40 relates to the LoRa server processing the stored radio data and its attendant signaling characteristics. The processing may be performed to facilitate optimizing interactions between the gateways under test, such as to facilitate determining overlapping coverage areas and related optimizations beneficial to improving the communications associated therewith, e.g., coordinating frequency usage, power levels, redundancy, servicing, etc. One optimization may include the LoRa server associating locational coordinates known for each of the gateways with the aggregated radio data to facilitate interrelating locations of each gateway relative to the signaling influences of the other gateways. One non-limiting aspect of the present invention contemplates the LoRa server periodically updating the stored radio data to maintain up-to-date information on signaling within the service area and/or to create time-based logs to account for signaling variations that may vary throughout the day, certain days of the week or to otherwise create a historical compilation of performance.

Figure 3:
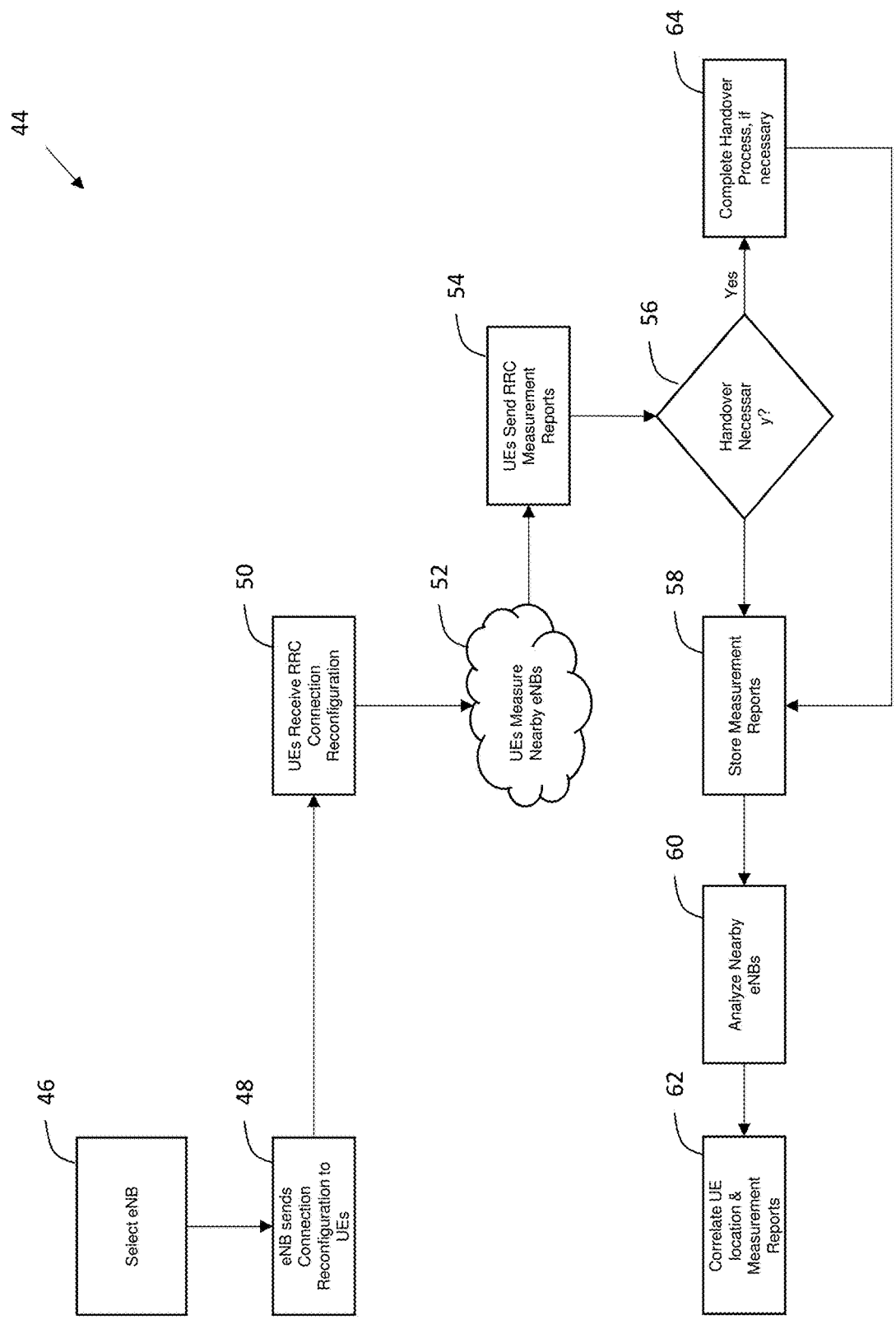
FIG. 3 illustrates a flowchart of a method for assessing wireless receivers in accordance with one non-limiting aspect of the present invention.

FIG. 3 illustrates a flowchart 44 of a method for assessing wireless receivers in accordance with one non-limiting aspect of the present invention. The method illustrates an exemplary, cellular implementation whereby UEs collect radio data for neighboring enodeBs (eNBs) for purposes of assessing signaling characteristics within a service area. A server may be in communication with the eNBs to facilitate tabulating the radio data and attendant signaling characteristics similar to the processes and operations described above. Block 46 relates to the server selecting an initial eNB to originate a ping or other test signal via one or more UEs associated therewith. The server may generate a corresponding radio resource control (RRC) for specifying connection configuration and/or reconfiguration parameters for the ping to be transmitted from the corresponding UEs. Blocks 48-52 relate to the corresponding UEs processing the RRC and generating radio measurements for nearby eNBs as a function of corresponding messages, pings, requests, etc. transmitted thereto. Block 54 relates to the UEs forwarding report messages having the corresponding radio measurements to the server for processing and optimization, such as to facilitate the assessment and optimization of the service area.

Block 56 relates to determining whether the originating eNB requires a handover operation whereby handover of one or more of its UEs may be requested. Block 58 relates to the handover being unnecessary and the server storing measurement reports according to the received radio data. Block 58 may relate to multiple storage operations whereby the server iteratively engages the other eNBs in the service area to facilitate the UEs associated therewith performing additional measurements for purposes of collecting the radio data associated therewith. Block 60 relates to the server analyzing the eNBs according to the collected radio data. The analysis may be based on cross-referencing the UE-measured signaling characteristics to interrelate each of the neighboring eNBs to each other. Block 62 relates to optionally further associating the signaling characteristics according to known locations of the eNBs to facilitate generating measurement reports whereby spatial relationships between the eNBs can be assessed according to the collected, signaling characteristics. The server may then perform optimizations or implement other control strategies to facilitate controlling signaling within the service area as a function thereof, such as to coordinate operation according to desired performance parameters.

Block 64 relates to determining the originating eNB or another one of the eNBs requiring a handover process. The handover process may correspond with the eNB requiring handover of one or more of its UEs to another eNB having capabilities sufficient to facilitate interactions therewith. The radio data and signaling characteristics collected by the server may be utilized to facilitate optimizing that handover decision by the server analyzing performance capabilities and interrelationships of the neighboring eNBs to make a recommendation for the handover. The eNBs may be configured or otherwise instructed to check with the server prior to implementing a handover to receive the recommendation and, optionally, may make the handover decision solely as a function of the server recommendation instead of making its own determination and/or without reliance on the UE requiring handover to make the decision. The capability of the present invention to facilitate handover operations according to recommendations of the server may be particularly beneficial in facilitating handovers according to an overall view of the service area that would otherwise be unavailable absent the server performing the assessment of wireless signaling contemplated herein.

Figure 4:
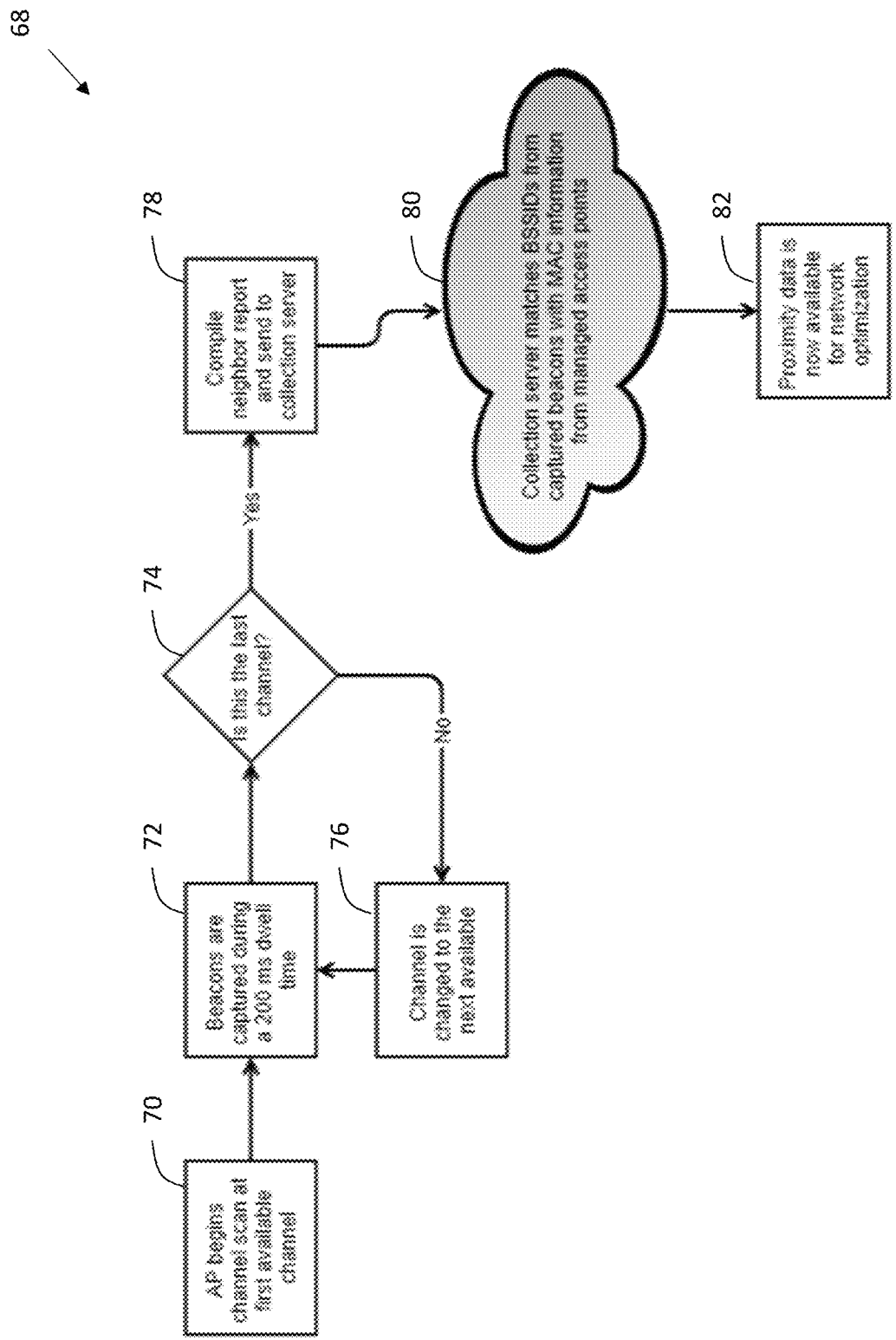
FIG. 4 illustrates a flowchart of a method for assessing wireless receivers in accordance with one non-limiting aspect of the present invention.

FIG. 4 illustrates a flowchart 68 of a method for assessing wireless receivers in accordance with one non-limiting aspect of the present invention. The method illustrates an exemplary, Wi-Fi implementation whereby access points (APs) collect signaling characteristics for purposes of assessing signaling within a service area. A server may be in communication with the APs to facilitate tabulating the radio data and attendant signaling characteristics similar to the processes and operations described above. Block 70 relates to the server selecting an initial AP to begin testing for signal interrelationships within the service area. The testing may include the initial AP scanning for beacons, pings other messages being transmitted from neighboring APs, such as those commonly employed at the neighboring APs to announce their presence and otherwise facilitate operations with the client/device associated therewith. The radio measurements may then be generated as a function of the received beacons. Block 72 relates to the initial AP switching from a normal operation mode to a listening mode whereby the AP captures or listens for beacons during a dwell time longer than that employed under normal operations, such as for 200 ms, to assure the AP is listening for a period of time sufficient to capture beacons omitted from the other APs on a repeating schedule, such as every 100 ms.

Block 74 relates to the AP listening to the channel for a sufficient period of time and thereafter assessing whether any additional channels are available. Block 76 relates to determining an additional channel to be available and changing to that channel for purposes of assessing it in Block 72. This process may be repeated until all available channels are measured. Block 78 relates to the AP compiling a neighbor report and sending the collected radio measurements to the server. Block 80 relates to the server matching basic service set identifier's (BSS IDs) from the captured beacons with media access control (MAC) information associated with the APs to facilitate cross-referencing the radio measurements between each of the APs. Block 82 relates to generating proximity data from the collected radio measurements, such as to facilitate determining proximity of APs to each other and their availability to facilitate network optimizations.

Block 82 may include the server generating radio measurements for each of the APs by iteratively controlling the APs in the service area to each individually perform measurements on beacons available thereto.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assessing a plurality of wireless transceivers after deployment within a service area, the method comprising:
receiving first radio data from a first plurality of the plurality of wireless transceivers, the first radio data representing wireless characteristics measured at the first plurality;
receiving second radio data from a second plurality of the plurality of wireless transceivers, the first plurality and the second plurality being different but sharing at least one common wireless transceiver, the second radio data representing wireless characteristics measured at the second plurality; and
associating the first radio data with the second radio data to generate a signaling map of the service area for the first and second plurality.

2. The method of claim 1, further comprising receiving the first and second radio data within reporting messages communicated from the first and second plurality, the reporting messages including signaling characteristics for signaling received at the corresponding one of the plurality of wireless transceivers from another one or more of the plurality of wireless transceivers.

3. The method of claim 1, further comprising instructing the plurality of wireless transceivers to transmit a reporting message for each received one of a first test signal and a second test signal, the first test signal being wirelessly transmitted from a first wireless transceiver of the first plurality, the second test signal being wirelessly transmitted from a second wireless transceiver of the second plurality, radio data in each reporting message representing measurement at the corresponding wireless transceiver of the wireless characteristics associated with receiving one or more of the first and second test signals.

4. The method of claim 3, further comprising instructing the plurality of wireless transceivers to include within each reporting message an identifier of itself and an identifier of the wireless transceiver transmitting the associated first and/or second test signal.

5. The method of claim 1, further comprising instructing the plurality of wireless transceivers to generate signaling characteristics as a function of measurements performed thereat for one or more of a first test signal and a second test signal, the first test signal being wirelessly transmitted from a first wireless transceiver of the first plurality, the second test signal being wirelessly transmitted from a second wireless transceiver of the second plurality.

6. The method of claim 5, further comprising instructing the plurality of wireless transceivers to include the following measurements as at least part of the signaling characteristics: a frequency measurement, a spread factor measurement, a relative signal strength indicator (RSSI) measurement, a signal-to-noise ratio (SNR) measurement, a received signal code power (RSCP), a reference signal received quality (RSRQ), and/or a reference signal received power (RSRP).

7. The method of claim 5, further comprising generating a signal map as a table sufficient for cross-referencing the signaling characteristics of the first and second test signals as received at each of the first and second plurality, including listing in the table each of the first and second plurality having overlapping signaling ranges.

8. The method of claim 7, further comprising associating location coordinates in the table with each of the first and second plurality, the location coordinates indicating placement of the first and second plurality within the service area.

9. The method of claim 5, further comprising instructing the plurality of wireless transceivers to switch from a normal mode to a listening mode when instructed to listen for the first and second test signals, the normal mode corresponding with normal operation where the plurality of wireless transceivers operate according to a dwell time less than a dwell time when operating according to the listing mode.

10. The method of claim 9, further comprising selecting the dwell time for the listening mode to be at least twice as great as a time frequency, the time frequency being a repeating interval for each of the plurality of wireless transceivers to independently transmit a beacon.

11. The method of claim 5, further comprising determining at least one of the second plurality to have a non-overlapping signaling range relative to one of the first plurality such that at least one of the plurality of wireless transceivers is incapable of receiving one of the first and second test signals.

12. The method of claim 1, further comprising:
determining a handover request made by a first wireless transceiver of the first plurality to handover a client associated therewith to another one of the plurality of wireless transceivers; and
selecting a target wireless transceiver of the plurality of wireless transceivers to take a handover of the client from the first wireless transceiver, including selecting the target wireless transceiver from one of the first and second plurality having overlapping signaling ranges with the first wireless transceiver.

13. The method of claim 1, further comprising generating the wireless characteristics according to signaling defined in 3rd Generation Partnership Project (3GPP) in Release 8 and 9 document series and/or TS 36.201, 36.300, 36.304, 36.306, 36.321, 36.322, 36.323, 36.331, 36.401, 36.306 and 36.902.

14. A method for assessing a plurality of transceivers after deployment within a service area, the method comprising:
instructing the plurality of transceivers to individually transmit a test signal such that a plurality of test signals are broadcasted across the service area;
receiving radio data from the plurality of transceivers, the radio data representing signaling characteristics associated with the plurality of test signals as individually received at the plurality of transceivers; and
processing the radio data to generate a signaling map of the service area.

15. The method of claim 14, further comprising:
generating the signaling map to define an interrelationship of the signaling characteristics sufficient to facilitate optimizing wireless signaling within the service area according to usage data collected after deployment of the transceivers; and
instructing the plurality of transceivers to include the following measurements as at least part of the signaling characteristics: a frequency measurement, a spread factor measurement, a relative signal strength indicator (RSSI) measurement, a signal-to-noise ratio (SNR) measurement, a received signal code power (RSCP), a reference signal received quality (RSRQ), and/or a reference signal received power (RSRP).

16. The method of claim 14, further comprising:
determining a handover request made by a first transceiver of the plurality of transceivers, the handover request resulting from signaling characteristics associated with the first transceiver indicating a need to handover a client associated therewith to another one of the plurality of transceivers;
selecting based on the signaling map a target transceiver from one of the plurality of transceivers having signaling overlap with the first transceiver; and
instructing the target transceiver to take a handover of the client from the first transceiver.

17. The method of claim 14, further comprising processing the signaling characteristics to determine:
one or more unnecessary transceivers of the plurality of transceivers, the unnecessary transceivers having signaling ranges overlapping with another one or more of the plurality of transceivers;
handing over clients associated with the unnecessary transceivers to the another one or more of the plurality of transceivers; and
shutting down the unnecessary transceivers after handing over the clients associated therewith.

18. The method of claim 14, further comprising processing the signaling characteristics to determine:
one or more overpowered transceivers of the plurality of transceivers, the overpowered transceivers having signaling strength above a threshold; and
reducing power of the overpowered receivers such that signaling with clients associated therewith are below the threshold.

19. A system, comprising:
a plurality of devices for facilitating wireless signaling with one or more clients associated therewith; and
a server in communication with the plurality of devices for optimizing wireless signaling within a service area of the plurality of devices according to radio data transmitted from the plurality of devices following deployment, the radio data reflecting signaling characteristics measured at one or more of the plurality of devices from artificial messages transmitted by one or more of the plurality of devices.

20. The system of claim 19, wherein the server includes a non-transitory computer-readable medium having a plurality of non-transitory instructions stored thereon and executable with an associated processor to facilitate:
instructing the plurality of devices to individually transmit at least one of the artificial messages such that a plurality of the artificial messages are broadcasted across the service area, including specifying signaling parameters to be used by the devices when transmitting the artificial messages; and
processing the radio data to generate a signaling map of the service area, the signaling map defining an interrelationship of the signaling characteristics sufficient to facilitate optimizing wireless signaling within the service area.

* * * * *